May 27, 1969 G. ULICS 3,446,507
UNIVERSAL JOINT BEARING SEAL ASSEMBLY
Filed Sept. 21, 1966
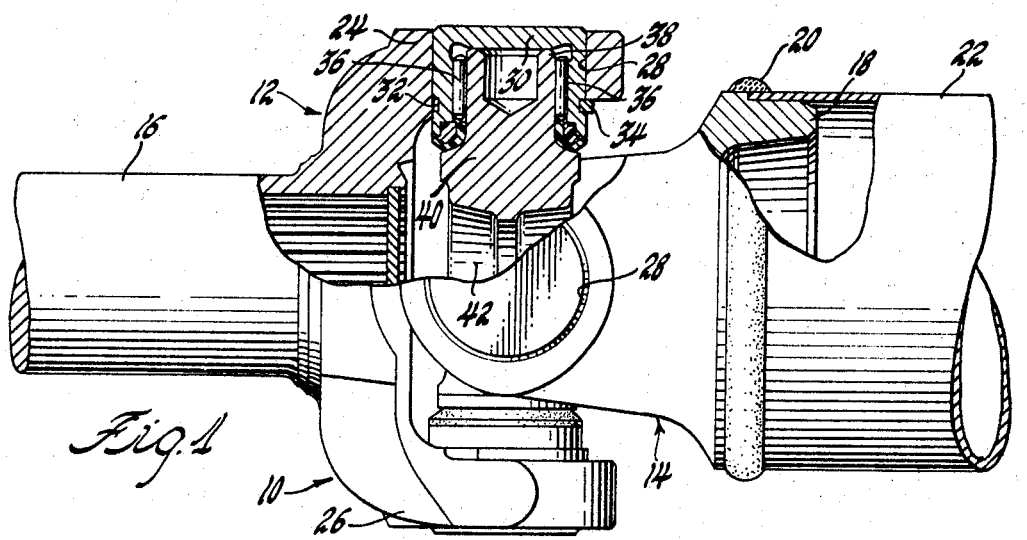
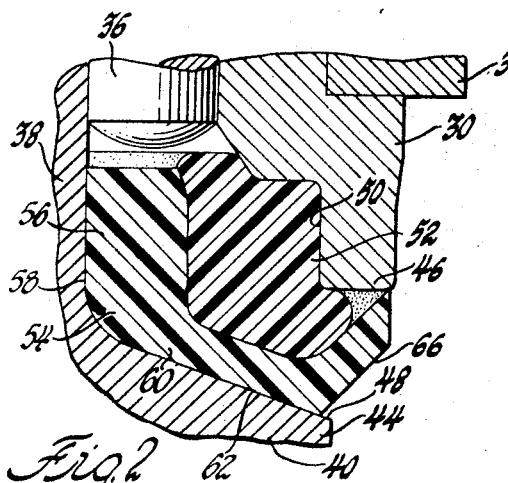
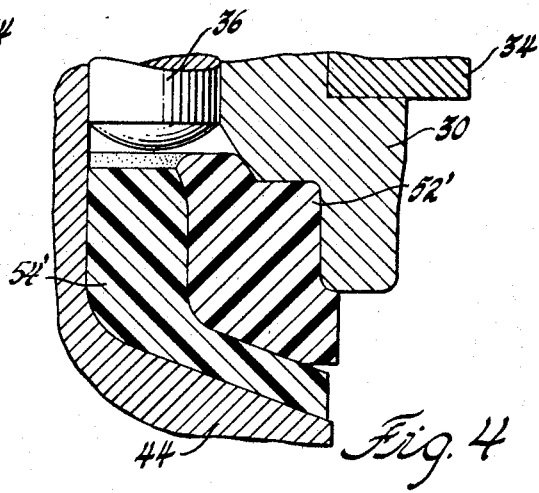
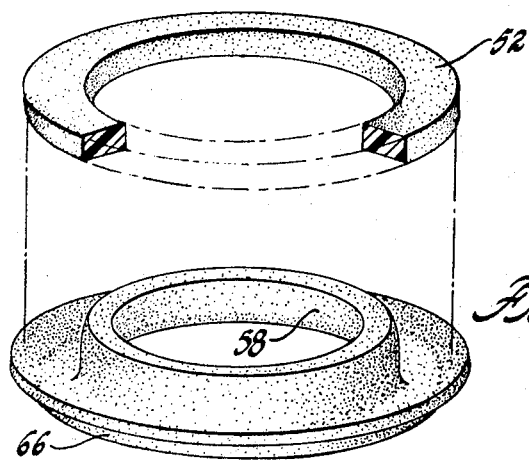
INVENTOR.
George Ulics
BY
David A. Greenlee
ATTORNEY United States Patent Office 3,446,507
Patented May 27, 1969

3,446,507
UNIVERSAL JOINT BEARING SEAL ASSEMBLY
George Ulics, Saginaw, Mich., assignor to General Motors Corporation, Detroit, Mich., a corporation of Delaware
Filed Sept. 21, 1966, Ser. No. 580,921
Int. Cl. F16j 15/38, 15/54, 15/00
U.S. Cl. 277—92                              3 Claims

ABSTRACT OF THE DISCLOSURE

A Cardan-type universal joint has a plastic shield engaging the trunnion, and a rubber seal compressively interposed between the plastic shield and the bearing cup so that any movement between members occurs between the shield and the trunnion reducing the wear of the seal and enabling it to have a longer life. A second embodiment uses a larger cross-section rubber seal so that in position in the point, the rubber seal bulges filling any empty spaces between the parts to eliminate dirt traps. A third embodiment adds a flange to the shield which extends between the trunnion and the bearing cup to exclude foreign matter from the seal surface.

---

This invention relates generally to bearing seal assemblies and more specifically to a bearing seal assembly for sealing the trunnion bearings of a Cardan-type universal joint.

Many different types of seal assemblies have heretofore been used for sealing the opening between universal joint bearing cups and trunnions to prevent bearing lubricant loss and bearing contamination by foreign matter. Prior seals have been formed of rubber, rubber and metal, or metal and cork. All of these prior seals were subject to wear due to friction which permitted lubricant loss and contamination of the bearings and resulted in bearing failure. This invention provides an improved trunnion bearing seal assembly having greatly improved wear characteristics which effect significantly increased bearing life.

One feature of this invention is that it provides a trunnion bearing seal assembly or sealing means having improved frictional wear characteristics. Another feature is that the seal assembly comprises an annular rubber seal and a plastic shield. Yet another feature is that the rubber seal is compressively interposed between the plastic shield and the bearing cup to bias the shield into sealing engagement with the trunnion. Still another feature is that the plastic shield includes an inclined flange engaging the bearing cup to preclude exposure of the rubber seal to foreign matter. A further feature is that the plastic shield is made of a low-friction plastic material to reduce frictional wearing and prolong the life of the seal assembly.

These and other features of this invention will become readily apparent upon reference to the following detailed description of the attached drawings in which:

FIGURE 1 is a partially broken away elevation view of a Cardan-type universal joint employing a seal assembly according to this invention;

FIGURE 2 is an enlarged fragmentary view of the seal assembly of FIGURE 1;

FIGURE 3 is an exploded view of the seal assembly;

FIGURE 4 is a view similar to FIGURE 2 showing an alternative embodiment of this invention.

Referring now to FIGURE 1 of the drawings, a Cardan-type universal joint, generally designated 10, includes a pair of yokes 12 and 14. Yoke 12 includes an internally splined shaft portion 16 that is adapted to be connected to a vehicle rear pinion input shaft. Yoke 14 includes a flange 18 that is welded at 20 to a vehicle drive shaft 22.

Yokes 12 and 14 are similarly constructed. Each includes a pair of arms 24 and 26 having aligned cylindrical openings 28. An open ended bearing cup 30 is mounted within each opening 28 by cooperation of an annular groove 32 and a locking ring 34. Each cup 30 includes a plurality of needle bearings 36 which support the cylindrical neck portion 38 of a trunnion 40. Four of these trunnions 40 comprise a spider 42 which drivingly interconnects yokes 12 and 14. Each trunnion 40 includes a tapered shoulder portion 44 which, with the lip 46 of cup 30, defines an opening 48. This annular opening 48 is closed by a seal assembly or sealing means according to this invention, as will now be described.

Referring now to FIGURES 2 and 3, bearing cup 30 includes an annular groove 50 which seats an annular rubber seal 52. Seal 52 preferably has a rectangular cross section, although any conventional molded shape may be used. A plastic shield 54 is mounted on the seal 52 and includes an upper portion 56 having an inner sealing surface 58 engaging trunnion neck 38 and a lower portion 60 having a lower sealing surface 62 engaging trunnion shoulder 44. To further seal opening 48, shield 54 includes an inclined flange 66 that extends between shoulder 44 and bearing cup 30. As shown in FIGURE 2, shield 54 compressively distorts seal 52 into the illustrated shape. Because of this compression, seal 52 biases shield 54 into tight sealing engagement with the trunnion, thus precluding the ingress of foreign matter or the loss of lubricant on either side of the shield.

The shield is made of a low-friction plastic material, such as, for example, nylon or other polyamides, polymerized formaldehyde commercially known as Delrin, or polymerized tetrafluoroethylene commercially known as Teflon. Because of the relatively high coefficient of friction of rubber, relative rotation occurring between bearing cup 30 and trunnion 40 due to angulation of the universal joint will effect relative movement between shield 54 and trunnion 40. Since shield 54 has an extremely low coefficient of friction, little wear occurs at seal surfaces 58 and 62. Tests have shown that prolonged use of this sealing arrangement produces no noticeable wear, whereas the prior art rubber, rubber and metal, or metal and cork seals showed excessive wear. Thus the egress of bearing lubricant and the ingress of contaminating foreign matter with respect to bearings 36 is significantly reduced, resulting in prolonged bearing life.

FIGURE 4 shows an alternative embodiment of this invention, comprising seal 52′ and shield 54′. In this embodiment flange 66 is eliminated from the shield. This configuration is particularly useful in applications wherein sufficient clearance is not provided to permit the inclusion of flange 66.

Seal 52 is initially assembled to cup 30 containing bearings 36. Shield 54 is then nested within seal 52. At this stage of assembly, handling damage to the bearings 36 is prevented by shield 54. This assembly is then mounted on trunnion neck 38 until shield 54 firmly seats on trunnion 40, compressing seal 52. During assembly the shield 54 further facilitates the centering of trunnion 40 within bearings 36.

Thus this invention provides an improved seal assembly for a universal joint trunnion bearing having significantly decreased frictional wear, thus prolonging bearing life. While only two embodiments of this invention are shown and described, further modifications are contemplated within the scope of this invention.

I claim:

1. In a universal joint having a trunnion member rotatably mounted in a bearing cup member by a multiplicity of bearings therebetween, and with an opening between the members below the bearings, sealing means for sealing the opening between the trunnion member and cup member comprising, an annular shield of plastic material, said shield conforming to the shape of one member and sealingly engaging the one member while having a spaced relationship to the other member, said shield and the one member being movable relative to each other, an annular seal of resilient material having a higher coefficient of friction than the plastic shield material and being of a size larger than the space between the shield and the other member, said seal being compressively interposed between the shield and the other member to bias the shield into sealing engagement with one member, said seal engaging the other member and conforming to the shape of the other member and closing the space between the shield and the other member, whereby upon angulation of the joint, the relative motion required by the joint for angulation occurs between the one member and the shield with substantially no relative movement between the shield, the seal, and the other member, reducing the wear on the sealing means and increasing its life.

2. A sealing means as recited in claim 1 wherein the space between the other member and the shield is generally of a rectangular cross-section having opposing shoulders across one diagonal and openings across the other diagonal, the annular seal being compressed across one diagonal between the opposing shoulders and being bulged into the openings between the other member and the shield across the other diagonal.

3. A sealing means recited in claim 1 wherein the annular shield includes a radial flange extending between the two members and blocking the access of foreign material to the seal.

References Cited

UNITED STATES PATENTS

| 2,285,623 | 6/1942 | Swenson et al. | 64—17 |
| 2,981,084 | 4/1961 | Glover | 64—17 X |
| 3,195,421 | 7/1965 | Rumsey et al. | 277—92 X |

LAVERNE D. GEIGER, *Primary Examiner.*

JEFFREY S. MEDNICK, *Assistant Examiner.*

U.S. Cl. X.R.

64—17; 277—165